United States Patent Office 3,695,907
Patented Oct. 3, 1972

3,695,907
PROCESS OF PREPARING TITANIUM PIGMENT OF IMPROVED RESISTANCE TO PHOTO-REDUCTION
Monroe M. Solomka and Gabriel Puente Fernandez, Bilbao, Spain, assignors to Dow-Unquinesa S.A., Bilbao, Spain
No Drawing. Filed Nov. 19, 1970, Ser. No. 91,198
Claims priority, application Spain, Nov. 22, 1969, 373,808
Int. Cl. C09c 1/36
U.S. Cl. 106—300
23 Claims

ABSTRACT OF THE DISCLOSURE

Titanium dioxide pigments of improved resistance to photo-reduction are produced by incorporating with the pigment at least about 0.05% by weight of a metal halate or perhalate.

BACKGROUND OF THE INVENTION

Titanium dioxide, pigment, available commercially in two of its three crystalline varieties: anatase and rutile, is widely used because of its great hiding or whitening power. For example, only small concentrations suffice for whitening plastics so that their mechanical properties are not diminished. The same is true for rubber. Other white pigments may also be used but much larger concentrations are necessary and this is usually undesirable, for example, in the case of rubber, elasticity is reduced and the danger of stress cracking is increased.

In spite of this great interest in the use of titanium dioxide, there are certain applications where it shows untoward properties. Titanium dioxide, in the presence of organic material and ultraviolet rays, tends to reduce to a lower oxide. Actually, the $Ti_2O_3$ formed is extremely small percentage-wise but it imparts its strong blue color to the pigmented system resulting in an undesirable discoloration. Accompanying this photo-reduction, which is especially marked in the case of anatase, is an oxidation of the organic material (binder). This is usually offered as the explanation of the chalking experienced by paint films on outdoor exposure.

The commercial introduction of rutile titanium dioxide which is inherently more stable and the subsequent development of the coating of the particles with inorganic oxides like $Al_2O_3$ and $SiO_2$ did much to improve the situation.

Nevertheless there are still areas of application, like coatings for outer space, the coloring of melamine and urea-formaldehyde resins, etc., where rutile although superior to anatase is still not sufficiently resistant to photo-reduction. This is especially true for the new laminated plastics based on paper and melamine resins.

GENERAL DESCRIPTION OF THE INVENTION

We have discovered that the addition of small quantities of halates or perhalates to the rutile pigment significantly suppresses the photo-reduction reaction. Even quantities as low as 0.05% by weight show a clear advantage. On the other hand no disadvantage has been observed in the case of fairly large quantities. Normally it is not necessary to employ more than about 0.25% by weight and often even 0.15% is sufficient.

There is a great variety of halate and perhalate compounds, some colorless, others colored, some water soluble and others insoluble. All are of benefit in suppressing photo-reduction. Nevertheless not all are equally desirable depending on the ultimate application of the pigment.

For the purpose of suppressing photo-reduction of a general purpose grade titanium pigment we prefer to employ alkali metal or alkaline earth metal halates and perhalates, since they are white or very lightly colored, and in particular they are fairly insoluble in water. Examples of alkali metal halates and perhalates include sodium and potassium chlorates, bromates and iodates, as well as perchlorates and periodates; of the periodates, both the metaperiodates and paraperiodates may be employed. Similarly, there may be utilized the corresponding alkaline earth metal halates and perhalates, examples of such alkaline earth metals being calcium, strontium and barium.

The metal halates or perhalates may be incorporated with the titanium dioxide pigments in any suitable manner, whether by dry or wet mixing. We prefer to add the halate or perhalate to an aqueous slurry of the titanium dioxide in order to assure the formation of a homogeneous final product.

The halate or perhalate may also be added to the dry pigment, before or after grinding. Our invention is not limited to the incorporation of the halate in any particular phase. The beneficial effect has been observed with both treated and untreated pigments. The treatment referred to is usually with 0.2 to 5% by weight of $Al_2O_2$. Other treatments with agents such as $SiO_2$, metallic silicates, zinc compounds, and metallic phosphates, may similarly be used. This invention is not limited to any special pretreatment, and is applicable to both rutile and anatase pigments.

The measurement of resistance to photo-reduction is advantageously carried out by forming a sample of the pigment into a paste with a solution of mandelic acid, and introducing a sample of the paste between two glass plates. The plates are then positioned in a rotary table 250 mm. from a source of ultraviolet radiation, and the change in reflectance with time is measured on a suitable reflectometer (or spectrophotometer), the reflectance being expressed as percent.

When the pigments produced in accordance with the invention are incorporated into synthetic resins, such as, for example, amine type resins, they show greatly enhanced resistance to discoloration as compared with pigments not containing the halate or perhalate additive.

DESCRIPTION OF THE PREFERRED EMBODIMENTS

The following example and tests described therein are intended to illustrate the practice of the present invention, but are not to be regarded as limiting:

Example

An aqueous slurry (25% by weight solids) of non-chalking rutile containing 1,000 kg. of titanium dioxide was treated with 1.5 kg. of potassium iodate and agitated for 4 hours at 25° C. Then, 3.0 kg. $BaCl_2.2H_2O$ were added, and the slurry agitated, once again, for 4 hours. After filtration, the pigment was dried and micronized. A similar slurry, without the iodate treatment, was likewise filtered and the pigment dried and micronized.

To measure resistance to photo-reduction, 10 g. of these pigments were formed into a paste with 5.2 cm.$^3$ of 0.5 N mandelic acid. One or two drops of water were also added in order to obtain a uniform creamy consistency so that the paste could be squeezed between two glass plates forming a uniform paste surface against the faces of the glass plates. The edges of the plates were sealed off with a strip of cellophane tape.

These plates were positioned in a rotary table 250 mm. from a G.E. 400 watt UV lamp type H 400 A 33–I and exposed to ultraviolet (UV) radiation.

The change in reflectance with time was measured on a Colormaster Differential Colorimeter; the values are listed in Table 1.

TABLE 1

| | No halate treatment | | | Treated according to Example 1 | | |
|---|---|---|---|---|---|---|
| Exposure time, min. | Percent reflectance | Reflectance decrease | Percent loss | Percent reflectance | Reflectance decrease | Percent loss |
| 0 | 85.8 | | | 84.0 | | |
| 135 | 84.8 | 1.00 | 1.20 | 83.8 | 0.20 | 0.25 |
| 315 | 83.4 | 2.40 | 2.80 | 83.1 | 0.90 | 1.05 |
| 435 | 81.8 | 4.00 | 4.65 | 82.8 | 1.20 | 1.45 |
| 615 | 79.4 | 6.40 | 7.45 | 82.6 | 1.40 | 1.65 |
| 795 | | | | 82.5 | 1.50 | 1.80 |
| 975 | | | | 82.4 | 1.60 | 1.90 |
| 1,155 | | | | 82.3 | 1.70 | 2.00 |
| 1,395 | | | | 81.6 | 2.40 | 2.85 |
| 1,575 | | | | 81.6 | 2.40 | 2.85 |
| 1,995 | | | | 80.7 | 3.30 | 3.90 |
| 2,355 | | | | 80.0 | 4.00 | 4.75 |
| 2,655 | | | | 79.7 | 4.30 | 5.10 |
| 3,015 | | | | 79.6 | 4.40 | 5.25 |
| 3,435 | | | | 79.4 | 4.60 | 5.45 |
| 3,795 | | | | 79.1 | 4.90 | 5.85 |
| 4,095 | | | | 78.7 | 5.30 | 6.30 |

Further, plastic "chips" were prepared from ureaformaldehyde and melamine resins as follows:

(a) 1,000 g. resin were mixed with 20 g. of the titanium dioxide pigment prepared in Example 1 and mixed for 3.5 hours in a ball mill.

(b) The colored resins were compression molded at 150° C. and 200 kg./cm.$^2$ pressure in 2.5 minutes in the case of ureaformaldehyde resins and 3 minutes with the melamine resin.

The "chips" obtained were exposed to UV radiation on the rotary table already described. Half of each chip was covered with metal foil. The change in color was noted from time to time, see Tables 2 and 3 below.

TABLE 2

| | Urea-formaldehyde plastic, 2% titanium dioxide | |
|---|---|---|
| Pigment | Exposure time, hours | Observed color change |
| Untreated | 12 | Appreciable. |
| Treated | 12 | Negligible. |
| Untreated | 24 | Further discoloration as compared with the 12 hr. sample. |
| Treated | 24 | Negligible. |

TABLE 3

| | Melamine plastic, 2% titanium dioxide | |
|---|---|---|
| Pigment | Exposure time, hours | Observed color change |
| Untreated | 12 | Appreciable. |
| Treated | 12 | Negligible. |
| Untreated | 24 | Appreciable. |
| Treated | 24 | Negligible. |

From these data the great advantage of the halate treatment is evident. As reflectance decreases, the normal white color of the pigment becomes blue. The treated pigment resisted 600% longer than untreated pigment. Moreover, even the discoloration observed rapidly disappears when the plastic is removed from the UV radiation.

To demonstrate even more this great "power of color recuperation," anatase was treated with 0.15% potassium iodate as in the previous example and compared with untreated anatase using the mandelic acid test. Upon exposure to UV rays the reflectance values of the samples decreased as shown in Table 4.

TABLE 4

| | Untreated | | Treated | |
|---|---|---|---|---|
| Exposure time, min. | Percent reflectance | Reflectance decrease | Percent reflectance | Reflectance decrease |
| 0 | 80.58 | | 82.80 | |
| 10 | 72.70 | 7.88 | 81.35 | 1.45 |
| 20 | 68.55 | 12.30 | 81.70 | 1.10 |
| 30 | 63.10 | 17.48 | 81.65 | 1.15 |
| 40 | 58.55 | 22.03 | 81.70 | 1.10 |
| 50 | 56.30 | 24.28 | 80.75 | 2.05 |
| 60 | 53.80 | 26.78 | 80.00 | 2.80 |
| 75 | 51.60 | 28.98 | 78.40 | 4.40 |
| 90 | 49.55 | 31.03 | 74.00 | 8.80 |
| 105 | 48.50 | 32.08 | 72.25 | 10.50 |

The reflectance (or brightness) of the untreated pigment, initially 80.58%, was reduced to 48.50% in 105 minutes—a tremendous loss in brightness. On the other hand the treated pigment, initially 82.80%, only fell to 72.25% in the same period of exposure. Both samples were placed in a darkroom for 105 minutes and the reflectance again determined. The reflectance of the untreated pigment continued practically unchanged (51.55%)

while that of the treated pigment had already reached, once again, the initial value (82.85%), see Table 5.

TABLE 5

| | Untreated | | Treated | |
|---|---|---|---|---|
| Time in darkroom, min. | Percent reflectance | Reflectance increase | Percent reflectance | Reflectance increase |
| 0 | 48.50 | | 72.25 | |
| 35 | 50.90 | 2.40 | 82.10 | 9.85 |
| 75 | 51.10 | 2.60 | 82.70 | 10.45 |
| 105 | 51.55 | 3.05 | 82.85 | 10.60 |

What is claimed is:

1. Process for improving the resistance to photo-reduction of titanium dioxide pigments which comprises incorporating with the pigment between about 0.05% and about 0.25% by weight of a metal salt selected from the group consisting of a chlorate, bromate, iodate, metaperiodate and paraperiodate of a metal selected from the group consisting of an alkali metal and an alkaline earth metal.

2. The process of claim 1 in which the pigment is anatase.

3. The process of claim 1 in which the pigment is rutile.

4. The process of claim 1 in which the metal salt is incorporated by admixing it with a slurry of the pigment.

5. The process of claim 1 in which the metal is an alkali metal.

6. The process of claim 1 in which the metal is an alkaline earth metal.

7. The process of claim 1 in which the metal salt is chlorate.

8. The process of claim 1 in which the metal salt is a bromate.

9. The process of claim 1 in which the metal salt is an iodate.

10. The process of claim 1 in which the metal salt is potassium iodate.

11. The process of claim 1 in which the metal salt is a metaperiodate.

12. The process of claim 1 in which the metal salt is a paraperiodate.

13. A titanium dioxide pigment containing as an agent for improving the resistance of the pigment to photoreduction between about 0.05% and about 0.25% by weight of a metal salt selected from the group consisting of a chlorate, bromate, iodate, metaperiodate and paraperiodate of a metal selected from the group consisting of an alkali metal and an alkaline earth metal.

14. The composition of claim 13 in which the metal is an alkali metal.

15. The composition of claim 13 in which the metal is an alkaline earth metal.

16. The composition of claim 13 in which the pigment is anatase.

17. The composition of claim 13 in which the pigment is rutile.

18. The composition of claim 13 in which the metal salt is a chlorate.

19. The composition of claim 13 in which the metal salt is a bromate.

20. The composition of claim 13 in which the metal salt is an iodate.

21. The composition of claim 13 in which the metal salt is potassium iodate.

22. The composition of claim 13 in which the metal salt is a metaperiodate.

23. The composition of claim 13 in which the metal salt is a paraperiodate.

References Cited

UNITED STATES PATENTS

| | | | |
|---|---|---|---|
| 3,433,594 | 3/1969 | Wilson et al. | 106—300 X |
| 3,356,456 | 12/1967 | Wilson | 106—300 X |

FOREIGN PATENTS

| | | | |
|---|---|---|---|
| 1,152,211 | 8/1963 | Germany | 106—300 |

TOBIAS E. LEVOW, Primary Examiner

H. M. S. SNEED, Assistant Examiner

U.S. Cl. X.R.

106—308 B